Nov. 22, 1932.    D. V. WESTER    1,888,403
DEVICE FOR APPLYING SEALING WAX
Filed Sept. 23, 1931
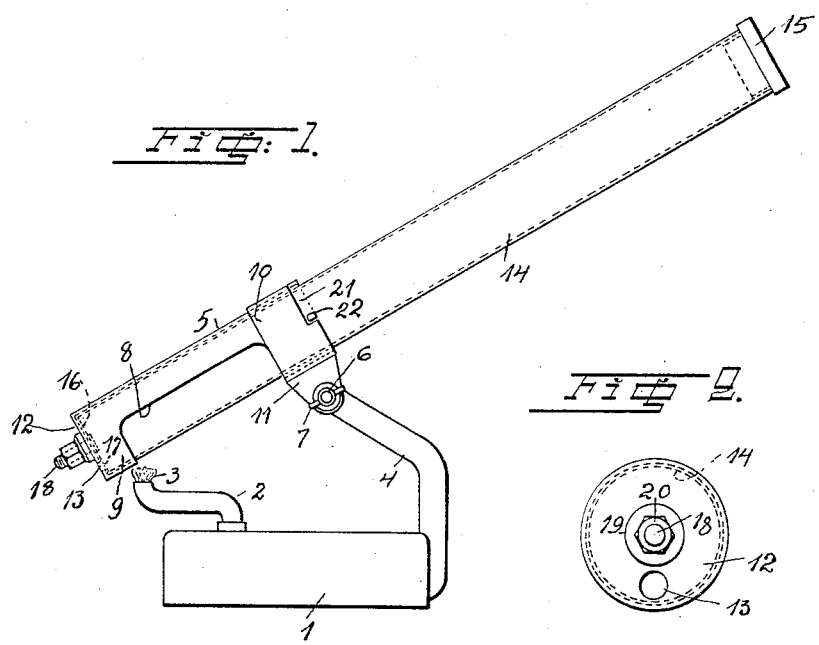
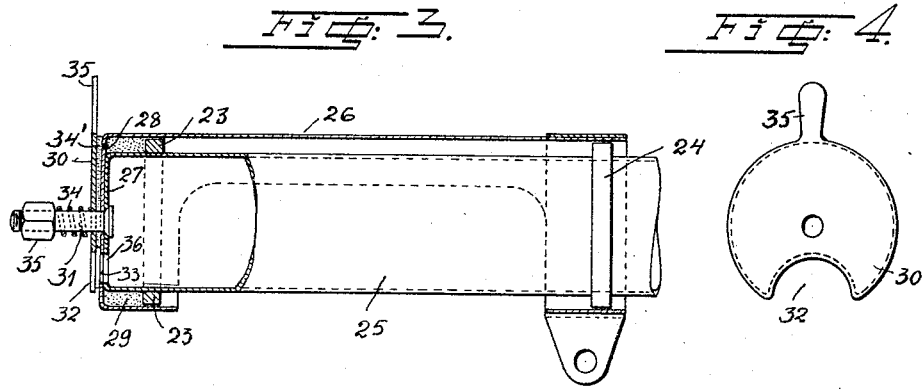
D. V. Wester
INVENTOR
By Attys. Marks & Clerks Patented Nov. 22, 1932

1,888,403

UNITED STATES PATENT OFFICE

DANIEL VERNER WESTER, OF STOCKHOLM, SWEDEN

DEVICE FOR APPLYING SEALING WAX

Application filed September 23, 1931, Serial No. 564,668, and in Sweden October 4, 1930.

This invention relates to a device by means of which sealing-wax may easily be applied to envelops, packages, documents and so on. According to the invention the tubular casing, in which the sealing-wax in the shape of a stick or the like is inserted and melted, is turnable in a sleeve-shaped holder and provided in its bottom with an opening which by turning the casing is brought to correspond with an opening in the bottom wall of the holder, as sealing-wax is to be applied, or is placed at the side of the same for the closing of the casing. In certain cases, especially as the sealing-wax should be kept heated during a longer period and thereby becomes thin-fluid, the device is provided with additional closing means which prevents the sealing-wax from wasting away from the tubular casing.

Fig. 1 in the accompanying drawing shows in a side view a device for applying sealing-wax arranged in accordance with this invention. Fig. 2 is an end view of the tubular casing on a greater scale. Fig. 3 shows in a side view partially in a longitudinal section a part of a device for applying sealing-wax provided with an additional valve for closing the tubular casing. Fig. 4 is a front view of the said valve.

1 is a receptacle for spirits or any other suitable fuel. The said receptacle is provided with a burner comprising for instance a tube 2 and a wick 3 and with an arm 4 extending upwards. A sleeve 5 of metal is fixed to the said arm 4 by means of a screw 6 and a fly-nut 7. Preferably, the said sleeve 5 has a cut 8, so that there are a fore cylindrical part 9 and a rear cylindrical part. A strip 10 of metal is soldered to the rear cylindrical part and the ends of the same are shaped to lugs 11, through which the screw 6 is slid. By tightening the nut 7 the sleeve 5 may be secured in any oblique position. The cylindrical part 9 has a bottom 12, in which an opening 13 is provided. Into the sleeve 5 thus arranged a tubular receptacle 14 is slid, which is open at its top end and may be shut by means of a plug 15 made of wood, cork or the like. The sealing-wax in the shape of a stick (not shown) is mounted in the receptacle. The lower end of the receptacle 14 is closed by a wall 16, which is provided with an opening 17 corresponding to the opening 13 in the bottom wall 12 of the sleeve 5. A screw-threaded pin 18 is fixed to the bottom wall 16 of the receptacle 14 at the centre of the same and extends through a hole in the bottom wall of the sleeve 5. On the said pin a washer 19 and a nut 20 are provided, which thus hold the tubular receptacle 14 in the sleeve 5 with the bottom 16 forced tightly against the bottom 12 of the sleeve 5.

By turning the receptacle 14 in the sleeve 5 the opening 17 in the bottom wall 16 of the receptacle may be brought to register with the opening 13 in the bottom wall 12, so that sealing-wax melted by the flame of the spirits flows out and may be gathered on the envelop etc. in a quantity necessary for a seal. After the applying of the sealing-wax the exit of the sealing-wax may be interrupted by so turning the receptacle 14, that its bottom wall 16 covers the opening 13 in the bottom wall 12. For the regulating of the outflow of sealing-wax from the receptacle 14 the receptacle is turned into such a position, that the openings 13 and 17 only partially coincide. For the controlling of the device being closed or open a notch 21 is provided in the edge of the sleeve 5 and the strip 10, into which a pin 22 fixed in the receptacle 14 extends, which pin 22 by striking the end walls of the notch 21 stops the receptacle in its open and closed position respectively.

In order that the tubular receptacle may easily be turned in the sleeve without any greater play being necessary, two rings 23 and 24, Fig. 3, are fixed to the tubular receptacle 25, which bear against the inner side of the sleeve-shaped holder 26 at the ends of the same. Owing to the fact that the sealing-wax, especially when heated during a longer period, while it becomes thin-fluid, could ooze out through the slight space between the bottom wall 27 of the receptacle 25 and the bottom wall 28 of the sleeve 26 and in this way escape from the device a packing 29 of a cloth of asbestos and rubber or similar packing is provided in the chamber between the ring 23 and the bottom wall 28 of the sleeve 26. As a measure of precaution against sealing-wax oozing out from the device, if the bottoms 27 and 28, owing to unevenesses or warpedness of the same should not fit closely to one another, the device is provided with an auxiliary valve, consisting of a disk 30, see also Fig. 4, which is slid on the screw-threaded pin 31 and provided with a notch 32, corresponding to the opening 33 provided in the bottom wall 28 of the sleeve 26. A coil-spring 34 is mounted on the pin 31 and bears against the disk 30 and a nut 35 screwed on the pin, thus forcing the bottom wall 27 of the receptacle 25 against the bottom wall 28 of the sleeve 26 and the disk 30 against the outer side of the bottom wall 28. In order to increase the tightness between the disk and the wall 28 the disk 30 may be provided on the side facing the bottom 28 with a covering 34' of asbestos-rubber-cloth or the like.

As sealing-wax is to be applied, the receptacle 25 is so turned, that the opening 36 in its bottom wall 27 coincides more or less with the opening 33 and by turning the disk 30 by means of its handle 35 the notch 32 is located in front of the opening 33. For the closing of the device the receptacle 25 and the disk 30 are so turned, that the opening 33 is covered by a not-perforated part of the bottom wall 27 and the disk 30.

The heating of the receptacle may be controlled by altering the oblique position of the receptacle or by swinging the burner, which is turnable, toward the one side or the other.

Owing to the fact that the device may be opened and closed simply by turning the tubular receptacle and it may be, the disk 30, the using of the device is rendered specially comfortable and the sealing operation may be effected without sealing-wax being dropped at the side of the place where the application is done.

I claim:

1. In a device for applying sealing-wax the combination of a tubular receptacle for the sealing-wax and provided in its bottom wall with an exit-opening for melted wax, a sleeve-shaped holder, in which the said receptacle is turnably mounted and which is provided with a bottom wall having an opening corresponding to the opening of the said receptacle, and means for heating the said receptacle.

2. A device as claimed in claim 1, characterized by an auxiliary valve, consisting of a turnably mounted disk, which is provided with an opening, corresponding to the opening in the bottom wall of the holder.

3. A device as claimed in claim 1, characterized by an auxiliary valve, consisting of a turnably mounted disk, which is provided with an opening, corresponding to the opening of the bottom wall of the holder, and by a tightening cover of a heat isolating material provided between the said disk and the bottom wall of the holder.

4. A device as claimed in claim 1, characterized by ring shaped projections provided on the outer side of the tubular receptacle and enclosing the receptacle, said projections bearing against the inner side of the holder.

5. A device for applying sealing-wax as claimed in claim 1 characterized by ring shaped projections provided on the outer side of the receptacle and enclosing the receptacle, said projections bearing against the inner side of the holder, and by a packing of heat isolating material provided in the chamber between the bottom of the holder and the adjacent ring shaped projections of the receptacle.

In testimony whereof I have hereunto affixed my signature.

DANIEL VERNER WESTER.